Figure 1:
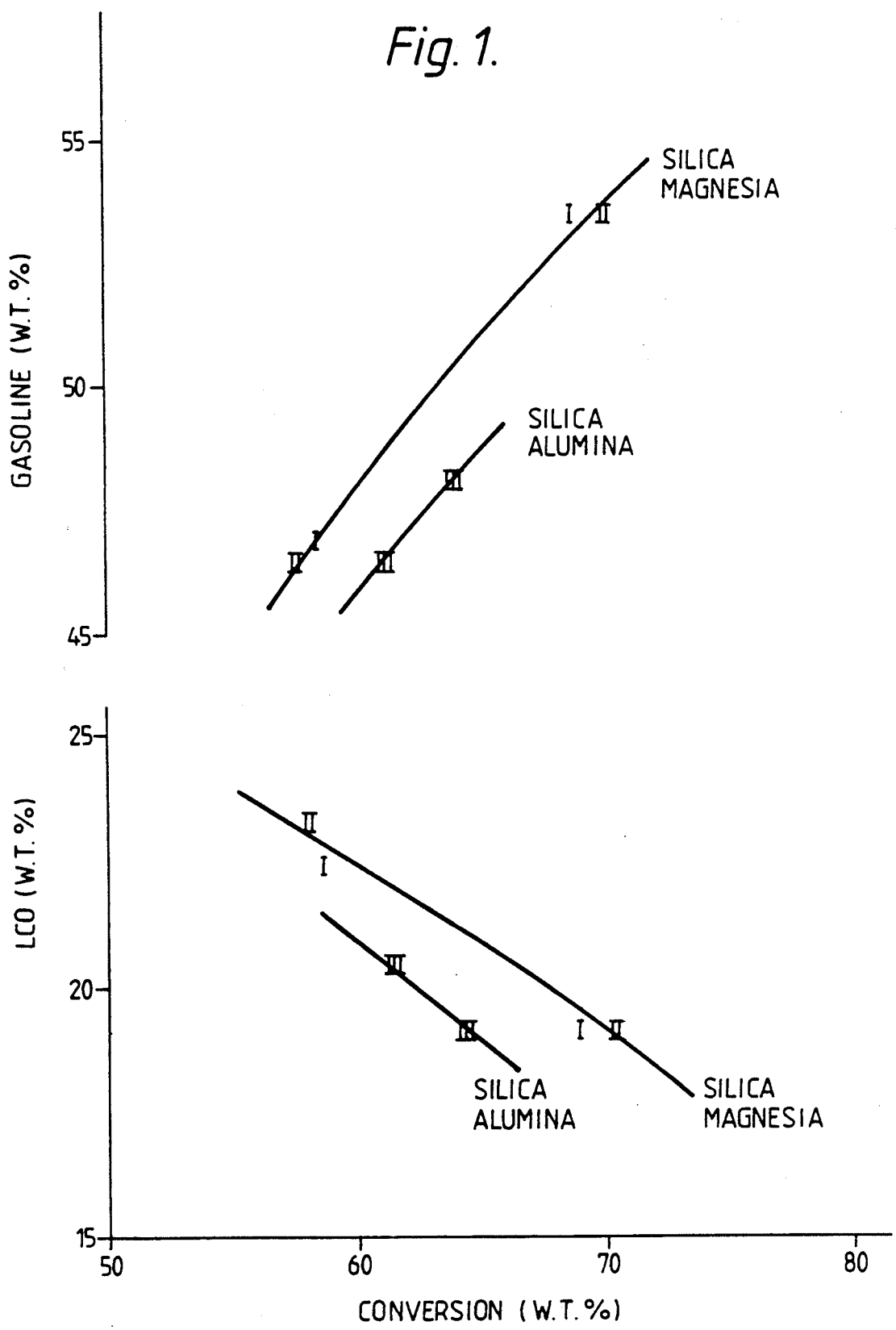

United States Patent [19]

Chapple

[11] Patent Number: 4,994,425
[45] Date of Patent: Feb. 19, 1991

[54] CATALYST BASE

[75] Inventor: Andrew P. Chapple, Wrexham, Wales

[73] Assignee: Unilever Patent Holdings B.V., Rotterdam, Netherlands

[21] Appl. No.: 322,569

[22] Filed: Mar. 13, 1989

Related U.S. Application Data

[63] Continuation of Ser. No. 79,082, Jul. 29, 1987, Pat. No. 4,849,394.

[30] Foreign Application Priority Data

Aug. 6, 1986 [GB] United Kingdom ............... 8619151

[51] Int. Cl.$^5$ ........................ B01J 21/14; B01J 21/16; B01J 29/04
[52] U.S. Cl. ........................................ 502/64; 502/68; 502/234; 502/251
[58] Field of Search ................... 502/234, 251, 64, 68; 208/119

[56] References Cited

U.S. PATENT DOCUMENTS 2,947,708  8/1960  Wilson, Jr. ........................... 502/234
4,280,898  7/1981  Tatterson et al. ................... 208/119

FOREIGN PATENT DOCUMENTS 245079  2/1963  Australia ............................ 502/251
561745  8/1958  Canada ............................... 502/234

Primary Examiner—Carl F. Dees
Attorney, Agent, or Firm—Cushman, Darby & Cushman

[57] ABSTRACT

A silica-magnesia cogelled material is usable as a base for petroleum cracking catalysts based on zeolites. Invention described provides cogel base in which the silica and magnesia components are intimately mixed. This feature is achieved by controlling the pH during the mixing procedure.

4 Claims, 1 Drawing Sheet

CATALYST BASE

This is a continuation of application Ser. No. 07/079,082, filed July 29, 1987 (U.S. Pat. No. 4,849,394).

FIELD OF THE INVENTION

This invention relates to silica-magnesia cogelled products and their use as bases for catalyst compositions based on zeolites. The catalyst compositions are intended for use in petroleum cracking.

BACKGROUND TO THE INVENTION

One composition of value in the catalytic cracking of petroleum feedstocks comprises a silica magnesia mixture as matrix, a zeolite as the active catalyst and, optionally, alumina. A general formula by weight for a composition of this type is

| silica-magnesia | 40% to 90% |
| zeolite | 5% to 40% |
| alumina | 0% to 40% |

These catalyst compositions are required to have certain properties, i.e. good gasoline and LCO selectivity and stability during use for example by resistance to attrition.

The silica-magnesia component must be chemically stable and present the properties of an intimate mixture of the silica and magnesia, that is the silica and magnesia should not be detectable separately, e.g. by IR analysis. The magnesium used in the processing should be retained completely in the product and not be removable by subsequent washing procedures. These requirements are not provided by the processes and products described in the literature or in commercial use.

GENERAL DESCRIPTION OF THE INVENTION

The invention provides a process for preparing a silica/magnesia catalyst base wherein:
(i) a liquid magnesia source at a pH below 10 and a liquid silica source are intimately mixed in proportions providing a magnesia content in the range 5% to 50% by weight in a liquor with a pH from 9.0 to 10, and
(ii) the resultant liquor is maintained at a pH 9.0 to 10 until no free magnesia is detected by IR spectroscopy, in the solid phase and no magnesium ions are detected in the solution phase, i.e. to a point where the reaction between silica and magnesia is complete.

The cogel obtained by this process may be used to provide a silica magnesia catalyst by separating the cogel from the liquor and drying it. This amorphous mixed oxide exhibits catalytic properties and may be used as such.

Preferably the process is continued for a period greater than about 5 hours after the point at which reaction is complete. During this aging step the porosity of the cogel is modified and improves its utility to act as a catalyst base for a zeolite petroleum cracking catalyst. Usually the cogel will be maintained at a temperature from about 40° C. to about 95° C. during this aging step although the desired porosity improvement of the final product can be achieved by aging below 40° C., albeit for a longer period.

Usually the mixing in the process will be performed at a temperature in the range from about 10° C. to about 70° C., preferably about 15° C. to about 50° C. Usually the silica source will be selected from sodium silicates, silica-hydrogels and silica sols while the magnesia source is preferably a soluble magnesium salt, conveniently magnesium sulphate, nitrate or chloride. Preferably, the silica source will have a silica content in the range 10 to 300 g/l and the magnesia source a magnesia content in the range 1 to 75 g/l.

When using the cogelled product as a base for a zeolite catalyst it is required that the components have a low sodium content. In the preparation of the silica magnesia catalyst base this is achieved by using a silica source having a low or negligible i.e. below 1% by weight, sodium content (expressed as $Na_2O$ on a dry basis). A suitable silica source for this purpose is a silica sol obtained by subjecting sodium silicate to an ion exchange process in which the sodium ions are replaced by protons.

Thus the silica magnesia cogel solid obtained from the process of the present invention will contain from about 5% to about 50% by weight of magnesia, and contains no free magnesia, i.e. detectable by IR spectroscopy or differential thermal analysis (DTA), or magnesium in a form that is removable by washing. The silica magnesia cogel solid prepared using a low sodium source and with the cogel slurry subjected to an aging step will have a porosity of less than 0.2 cc/g and a sodium content below 0.4% by weight; porosity being measured by mercury intrusion.

The invention is based on the finding that reaction of silica and magnesia from suitable sources with the magnesia source at a pH below 10 provides a cogelled silica/magnesia material which satisfies the requirements of petroleum cracking. The cogel will provide an amorphous mixed oxide base for a petroleum cracking catalyst.

The silica/magnesia cogelled catalyst base contains magnesia at a level of about 5% to about 50% by weight, a sodium level below 0.4% by-weight, a porosity less than 0.2 cc/g, no detectable free magnesia, and no magnesium in a form removable by washing.

The invention includes a process for preparing a catalyst wherein the cogel liquor obtained by mixing the silica and magnesia sources is intimately mixed with a zeolite and, optionally alumina, clay and a binder, and the resultant mixture dried to provide a petroleum cracking catalyst with the composition
about 40% to about 90% by weight silica-magnesia base,
about 5% to about 40% by weight zeolite,
about 0% to about 40% by weight alumina,
about 0% to about 50% by weight clay, and
about 0% to about 50% by weight binder.

Components

The individual components of the catalyst composition of the invention, other than the silica magnesia base, are well characterised in the literature. The silica magnesia cogel of the present invention may be prepared, as described previously, to provide a mixed oxide base for, e.g. petroleum catalysis. By utilising the silica source materials having a low sodium content and by having an aging step after full reaction of the silica and magnesia there is obtained a cogel which is particularly suitable as a base for a petroleum cracking catalyst. This base will include a zeolite catalyst and, optionally, alumina and clay components.

The zeolite, a crystalline alumino silicate, useable in the present invention includes the synthetic zeolites A, B, D, E, F, L, Q, R, S, T, X, Y, Z, beta, omega, ZSM types, ZK-4 and ZK-5 in addition to the naturally occurring zeolites, e.g. chabazite, faujasite, mordenite and offretite. Preferably the crystaline aluminosilicate zeolite is a Y type faujasite, more preferably stabilised by ion exchange with ammonium salt to reduce the alkali metal content of the zeolite and subsequently calcined. The zeolite component may also contain a proportion of rare earth metals to improve the activity of the catalyst.

The optional alumina component of the catalyst is in the form of particles and various aluminas may be used and are commercially available. Both anhydrous and hydrated forms can be used. There are no criticality in the particle size of the alumina component but preferably it will be below 10 micron, more preferably below 3 micron.

The catalyst composition of the present invention comprising silica magnesia cogel 40–90% by weight (dry basis), zeolite 5% to 40% by weight is used for the catalytic cracking of petroleum feedstocks using well-characterised techniques. The catalyst is suitable for use with feedstocks including heavy and light gas oils and oils extracted from shale, tar and coal.

Literature

GB 2069363 (Chiyoda) describes preparation of a silica-magnesia cogel but the pH conditions do not satisfy the requirements of the present application.

SPECIFIC DESCRIPTION OF THE INVENTION

Examples of the product and process will now be given to illustrate but not limit the invention.

EXAMPLE 1

This describes the preparation of silica magnesia cogel slurry.

Preparation of silica source 1800 g of an ion exchanged silica sol (5% w/w $SiO_2$) was prepared by conventional ion exchange of sodium silicate solution at pH 2.7. The pH of this sol was rapidly raised to pH 10 by the addition of 12.5% ammonia solution (130 ml)—solution A.

Preparation of magnesium source 131 g of $MgSO_4.7H_2O$ was dissolved in 400 g deionised water. To this solution was added slowly, with constant agitation, 12.5% ammonia solution. Addition of the ammonia was continued until the solution became turbid (i.e. the onset of precipitation of $Mg(OH)_2$). At this point, the pH of the solution was 10—solution B.

Preparation of cogel

Solution B was added to solution A with constant high power (turbine) agitation. During the addition of solution B, the mixture began to gel. The gel so formed was broken into a slurry by the high power agitation. Following the complete addition of solution B, the resulting slurry was heated to 50° C. and allowed to react for 5 hr. During this reaction time, the pH was found to decrease and was maintained in the region 9.7 to 10 by further addition of ammonia solution.

Following the 5 hr reaction time, the slurry was then aged for a further 40 hr at 50° C. This slurry was usable to provide a silica-magnesia catalyst material or a catalyst base for other catalytic materials.

EXAMPLE 2

Cogel isolation

A silica-magnesia slurry was prepared in exactly the same manner as described in Example 1. This slurry was filtered. Tests on the filtrate at this point showed the absence of magnesium ions in solution.

The filter-cake was washed with dionised water and dried at 100° C. for 16 hr.

The silica magnesia powder product so prepared was then analysed by infra-red spectrometry and differential thermal analysis (DTA). Both methods showed only the presence of magnesium chemically incorporated with the silica. Magnesium in the form of free $Mg(OH)_2$ was not detected. The product contained 20% by weight magnesia.

EXAMPLE 3

Use of nitrate as magnesium source

A silica-magnesia cogel was prepared as described in Example 1, with the exception that 132 g of $Mg(NO_3)_2.6H_2O$ was used instead of the 131 g $MgSO_4.7H_2O$ in the preparation of solution B.

The slurry so prepared was then filtered and washed and dried as described in example 2. Again, no evidence of magnesium ions in solution was found in any of the filtration.

DTA of the dried product showed only the presence of magnesium chemically incorporated with silica. No free $Mg(OH)_2$ was detected.

EXAMPLE 4

Use of sulphate as magnesium source

A silica-magnesia cogel was prepared as described in Example 1, with the exception that 65.5 g of $MgSO_4.7H_2O$ dissolved in 200 g deionised water were used in the preparation of solution B.

The slurry so prepared was filtered, washed and dried as described in Example 2. No magnesium ions were detected in the filtrate at the filtration stage. DTA of the dried cogel showed only the presence of magnesium incorporated chemically into the silica. No free $Mg(OH)_2$ was detected.

EXAMPLE 5

Use of sulphate as magnesium source

A silica-magnesia cogel was prepared as described in Example 1, with the exception that 196.5 g of $MgSO_4.7H_2O$ dissolved in 600g deionised water were used in the preparation of solution B.

The slurry so prepared was filtered, washed, and dried as described in Example 2. No magnesium ions were detected in the filtrate at the filtration stage. DTA of the dried cogel showed only the presence of magnesium incorporated chemically into the silica. No free $Mg(OH)_2$ was detected.

EXAMPLE 6

Silicate as silica source 60 g of sodium silicate solution (29.3%, $SiO_2$, 8.9% $Na_2O$) was diluted with 300 g deionised water—solution A.

26.2 g $MgSO_4.7H_2O$ was dissolved in 80 g deionised water—solution B.

Solution A was added to solution B with constant agitation. A white precipitate was immediately formed.

The pH of the final slurry was 9.7. This slurry was reacted for 5 hr at a temperature of 50° C. The pH of the slurry decreased over this time, and was adjusted to 9.7–10 by addition of ammonia. Following the reaction time, the slurry was aged for a further 40 hr at 60° C.

The slurry was then filtered. Tests on the filtrate at this point showed the absence of magnesium ions in solution.

The filter cake was then washed with deionised water and dried at 100° C. for 16 hr.

The product so prepared showed only the presence of magnesium chemically incorporated with the silica when analysed by DTA. No free $Mg(OH)_2$ was detected.

EXAMPLE 7

Washing regimes for cogel (silicate source)

211 g of sodium silicate solution (29.3% $SiO_2$, 8.9% $Na_2O$) was diluted with 789 g deionised water. The pH of this solution was adjusted to pH 9.8 by the addition of sulphuric acid (12% w/v), causing the mixture to gel. The resulting gel was broken into a slurry using a turbine agitator—slurry A.

87.7 g $MgSO_4.7H_2O$ was dissolved in 200 ml deionised water. To the solution was added slowly, with constant agitation, 12.5% w/w ammonia solution. Addition of the ammonia solution was continued until the solution became turbid, i.e. the onset of precipitation of $Mg(OH)_2$. At this point, the pH of the solution was 9.8—solution B.

Solution B was added to slurry A with constant agitation. Following addition, the temperature was raised to 50° C., and the mixture reacted for 5 hr. During this time, the pH of the slurry was found to decrease, and was maintained at 9.7–10 by addition of 12.5% ammonia solution. Following reaction, the mixture was aged for a further 40 hr at 50° C.

Following aging, the mixture was divided into three separate samples and treated as follows.

Sample I

The slurry was simply filtered and the filter cake dried at 100° C. for 16 hr. Magnesium ions were not detected in the filtrate.

Sample II

The slurry was filtered. No magnesium ions were detected in the filtrate. The filter cake was then washed with 1000 g deionised water at 65° C. and then dried at 100° C. for 16 hr.

Sample III

The slurry was filtered. Magnesium ions were not detected in the filtrate. The filter cake was then washed firstly with 1000 g deionised water, then 1000 g of 3% w/w ammonium sulphate solution, and finally again with 1000 g deionised water, all at 65° C. The resulting filter cake was dried at 100° C. for 16 hr.

EXAMPLE 8

Washing regimes for cogel (silica source)

A silica-magnesium slurry was prepared as described in Example 1. Following aging, the mixture was split into three separate samples, and these samples treated in the same manner as the equivalent samples in Example 7, giving respectively samples IV, V and VI.

Samples I–VI from Examples 7 and 8 were analysed for sodium using atomic absorption spectroscopy. The results are detailed in Table 1.

Table I clearly shows the value of using ion exchanged silica sols as the source of silica in the preparation of silica-magnesia cogels to provide very low residual sodium levels. If further reduction of sodium level is required then a simple washing procedure may be implemented (compare samples IV and VI). Equivalent materials derived from sodium silicate have, at all stages, higher residual sodium levels.

TABLE 1

| Residual Soda Levels on Silica-Magnesia Cogels from Examples 7 and 8 | | | | | | |
|---|---|---|---|---|---|---|
| Silica Source | Sodium Silicate | | | | Silica Sol | |
| Sample | I | II | III | IV | V | VI |
| $Na_2O$ (Dry Basis) | 10.42 | 1.87 | 0.082 | 0.069 | 0.026 | 0.003 |

EXAMPLE 9

Zeolite catalyst

A silica-magnesia slurry was prepared as described in Example 1 except using 9600 g of ion exchanged silica sol (5% $SiO_2$) adjusted to pH 10 for solution A, and 734 g $MgSO_4.7H_2O$ dissolved in 1100 g deionised water adjusted to the onset of precipitation of $Mg(OH)_2$ with ammonia solution for solution B.

To the aged slurry was then added 200 g dry basis of an ultrastable Y zeolite (sold under the trade name LZY-82 by the Union Carbide Corporation), and 200 g alumina (sold under the trade name Pural SCF by Condea Chemie). The composite slurry was then bead milled to reduce particle size using 1 mm diameter beads, and then spray dried.

The spray dried product was slurried in water at 65° C. (1 liter of water per 500 g of product), and filtered. The filter cake was then further washed with deionised water, followed by 3% w/w ammonium sulphate solution, and finally with deionised water until the filtrate was of low conductivity (<1 mmho). The filter cake was then dried at 100° C. giving the final catalyst. The catalyst contained by weight 60% silica magnesia cogel, 20% zeolite and 20% alumina.—Catalyst I.

EXAMPLE 10

Zeolite catalyst

A further silica-magnesia based catalyst was prepared as described in Example 9 with the exceptions that the ultrastable Y zeolite was replaced by 200 g (dry basis) of a calcined ammonium exchanged Y zeolite containing rare earth ions (8% w/w as $RE_2O_3$), and the Pural SCF alumina was replaced with 200 g (dry basis) of a freshly precipitated alumina having the X-ray diffraction pattern characteristic of pseudo-boehmite—Catalyst II.

EXAMPLE 11 (comparison)

Silica-alumina catalyst base

A silica alumina based catalyst was prepared for comparison with Examples 9, 10.

5090 g of sodium silicate solution containing a total of 449 g $Na_2O$, and a $SiO_2$ concentration of 50 g/liter was diluted with 24.1 liters of deionised water. To the silicate solution was added 5650 g of $Al_2(SO_4)_3$ solution containing the equivalent of 393 g $Al_2O_3$, and 655 g of a sodium aluminate solution containing the equivalent of 131 g Al$_2$O$_3$, with constant agitation. The pH of the hydrogel slurry so formed was then adjusted to 5.5 with ammonia solution.

To this hydrogel slurry was added 675 g of ultrastable Y zeolite (sold under the trade name LZY-82 by Union Carbide Corporation), 675 g of alumina (sold under the trade name Pural SCF by Condea Chemie), and a further 2.5 liters of deionised water. This slurry was then bead-milled to reduce particle size, using 1 mm diameter beads, and then spray dried.

The spray dried product was slurried in water at 65° C (1 liter of water to 500 g of product), and filtered. The filter cake was then further washed with deionised water, followed by 3% ammonium sulphate solution, and finally deionised water until the filtrate was of low conductivity (<1 mmho). The filter cake was then dried at 100° C. giving the final catalyst—Catalyst III.

EXAMPLE 12

Catalyst properties 50 g samples of the catalyst from Examples 9–11 were separately steam deactivated at a temperature of 760° C. for a period of 5 hr in an atmosphere of 100% steam, at atmospheric pressure. These steam deactivated catalysts were then tested for catalytic performance, using a Micro Activity Test apparatus using conditions detailed in Table 2. The results of the catalytic evaluation are given in Table 3.

TABLE 2

| Micro Activity Test Conditions | |
|---|---|
| Weight of Catalyst | 4.0 g |
| Weight of Oil | 1.33 g |
| Oil Delivery Time | 75 second |
| Reaction Temperature | 482° C. |
| Analysis of Oil Feedstock | |
| Gravity °API | 26.7 |
| Sulphur wt % | 0.64 |
| Nitrogen wt % | 0.09 |
| Carbon Residue wt % | 0.39 |
| Aniline Point °F. | 182.0 |
| Distillation (°F.) | |
| 10% at 760 mm Hg | 574 |
| 30% at 760 mm Hg | 682 |
| 50% at 760 mm Hg | 773 |
| 70% at 760 mm Hg | 870 |
| 90% at 760 mm Hg | 991 |
| Initial Boiling Point | 338 |
| Final Boiling Point | 1061 |

TABLE 3

Micro Activity Test Results - 760° C. Deactivation

| | Catalyst No. | | |
|---|---|---|---|
| Wt % | I | II | III |
| Conversion | 68.8 | 70.2 | 64.2 |
| Gasoline | 53.2 | 53.6 | 48.1 |
| LCO | 19.1 | 19.1 | 19.1 |
| Total Distillate (Gasoline + LCO) | 72.3 | 72.7 | 67.2 |

EXAMPLE 13

Catalyst properties 50 g samples of the catalysts from Examples 9–11 were separately steam deactivated at a temperature of 788°C. for a period of 5 hr in an atmosphere of 100% steam, at atmospheric pressure. These steam deactivated samples were then tested for catalytic performance using a Micro Activity Test apparatus using conditions detailed in Table 2. The results of the catalytic evaluation are given in Table 4.

These results show an increase in total distillate yield for the catalysts of this invention. If both gasoline and LCO yields are separately plotted as a function of conversion (FIG. 1) then this increase in total distillate is seen to result from increases in both gasoline and LCO.

TABLE 4

Micro Activity Test Results - 788° C. Deactivation

| | Catalyst No. | | |
|---|---|---|---|
| Wt % | I | II | III |
| Conversion | 58.4 | 58.1 | 61.4 |
| Gasoline | 46.8 | 46.5 | 46.5 |
| LCO | 22.4 | 23.2 | 20.4 |
| Total Distillate (Gasoline + LCO) | 68.2 | 69.7 | 66.9 |

EXAMPLE 14

Attrition properties

A silica-magnesia based catalyst was prepared as described in Example 9, with the exception that the 40 hr aging period in the preparation of the silica-magnesia slurry was omitted.—Catalyst IV.

The attrition resistance of the catalysts prepared in Examples 9 and 14 were determined using a conventional jet cup attrition apparatus. The results of these tests (Davison Index—DI) are given in Table 5. These results show the benefit of the aging step on catalyst physical properties.

TABLE 5

| Attrition resistance of catalysts from Examples 9 and 14 | |
|---|---|
| Catalyst No. | Davison Index |
| I | 24 |
| IV | 79 |

I claim:
1. A silica/magnesia cogel solid containing from about 5% to about 50% by weight of magnesia, based on the total of silica and magnesia, said silica/magnesia having a porosity of less than 0.2 cc/g, and essentially all of the magnesia being chemically incorporated within the cogel such that no free magnesia, detectable as magnesium hydroxide by IR spectroscopy, is present in the cogel.

2. A silica-magnesia cogel solid according to claim 1 having a porosity of less than 0.2 cc/g and a sodium content below 0.4% by weight.

3. A petroleum cracking catalyst comprising:
   40 to 90% by weight of silica/magnesia catalyst base of claim 2,
   5 to 40% by weight of zeolite,
   0 to 40% by weight of alumina,
   0 to 50% by weight of clay, and
   0 to 50% by weight of binder.

4. A process for preparing a catalyst, wherein a silica/magnesia catalyst cogel is first prepared according to the following steps:
   (i) intimately mixing a liquid magnesia source at a pH below 10 and liquid silica source in proportions providing a magnesia content in the range 5% to 50% by weight based on the total of silica and magnesia in a liquor with a pH from 9.0 to 10, and
   (ii) maintaining the resultant liquor at a pH 9.0 to 10 until no free magnesia is detected in the solid phase by IR spectroscopy, and magnesium ions are not detected in the liquid phase, thereby obtaining a said silica/magnesia catalyst cogel in which essentially all of the magnesia is chemically incorporated within the cogel, and the thus prepared cogel is then intimately mixed with a zeolite and, optionally, alumina and, optionally, a clay and the resultant mixture dried to provide a petroleum cracking catalyst with the composition
40 to 90% by weight silica/magnesia base,
5 to 40% by weight zeolite,
0 to 40% by weight alumina, and
0 to 50% by weight clay.

* * * * *